United States Patent
Yokoyama et al.

(12)

(10) Patent No.: US 6,440,572 B1
(45) Date of Patent: Aug. 27, 2002

(54) COMPOSITION, ANTISTICKING AGENTS, AND THERMAL TRANSFER RECORDING FILMS

(75) Inventors: Norio Yokoyama; Hironori Hata, both of Aichi (JP)

(73) Assignee: Natoco Paint Co., Ltd., Aichi (JP)

( * ) Notice: Subject to any disclaimer, the term of this patent is extended or adjusted under 35 U.S.C. 154(b) by 0 days.

(21) Appl. No.: 09/403,852

(22) PCT Filed: Feb. 2, 1998

(86) PCT No.: PCT/JP98/00436

§ 371 (c)(1),
(2), (4) Date: Oct. 25, 1999

(87) PCT Pub. No.: WO98/49236

PCT Pub. Date: Nov. 5, 1998

(30) Foreign Application Priority Data

Apr. 25, 1997 (JP) .............................................. 9-122973

(51) Int. Cl.⁷ .......................... B32B 9/04; C08L 83/10; C08L 31/04; C08L 77/00; C08L 67/06
(52) U.S. Cl. ........................ 428/447; 525/106; 525/431; 525/446; 525/100
(58) Field of Search ................................. 525/100, 106, 525/431, 446; 428/447

(56) References Cited

U.S. PATENT DOCUMENTS 5,308,681 A  * 5/1994 Taki et al.
5,370,930 A  * 12/1994 Ito
5,916,844 A  * 6/1999 Tamura et al.
5,952,103 A  * 9/1999 Shiokawa et al.

FOREIGN PATENT DOCUMENTS

JP            61-143195 A   * 12/1984

* cited by examiner

Primary Examiner—Robert Dawson
Assistant Examiner—Marc S. Zimmer
(74) Attorney, Agent, or Firm—Cooper & Dunham LLP; Donald S. Dowden

(57) ABSTRACT

The object of the present invention is to prevent the sticking of the heat sensitive transfer recording film without generating head refuse and further to prevent transfer obstruction. More particlarly, the present invention provides a compound comprising a polydimethylsiloxane copolymer and one or more synthetic resin(s) selected from a group consisting of polyvinyl acetate derivatives, polyamide, acrylic resin, epoxy resin, unsaturated polyester resin and precursor of unsaturated polyester and/or cellulose derivatives; and sticking proof agents containing said compound; and a heat sensitive transfer film having a sticking proof layer formed by using the agents.

4 Claims, No Drawings

COMPOSITION, ANTISTICKING AGENTS, AND THERMAL TRANSFER RECORDING FILMS

FIELD OF THE INVENTION

The present invention relates to a novel compound. Said novel compound is useful as paint used in a field wherein weatherability and lubricancy are necessary, such as paint to prevent sticking ice or snow, paint to prevent attaching of paper and the like. Further said novel compound is useful as a coating agent giving the surface of plastic film such as polyvinyl chloride film, polyester film and the like or the surface of carrier or base such as paper used for electronic photograph, water repellency, lubricancy, heat resistance and the like. Still further said novel compound is useful as a sticking proof agent used as heat sensitive transfer recording media. Further the present invention relates to a sticking proof agent and a heat sensitive transfer recording film using said novel compound.

PRIOR ART

Hitherto, silicone paint has been used as paint to prevent sticking ice or snow, paint to prevent attaching of paper and the like. Further iron powder, ferrite powder and the like used in electronic photograph have been treated with a coating agent to give environment resistance, durability, wear resistance and the like. Still further the surface of plastic film such as polyethylene terephthalate (PET) film, polyethylene naphthalate (PEN) film, and the like used as the base of a magnetic recording tape, heat sensitive transfer ink ribbon, and the like have been treated with a coating agent to give water repellency, lubricancy, heat resistance, and the like.

Mainly, a compound containing reactive silicone, polydimethylsiloxane oil and the like has been used as said coating agent.

Nevertheless, said compound containing reactive silicone, polydimethylsiloxane oil and the like has problems in that coating film of said compound has a low adhesiveness and a low transparency and has stickiness on its surface. Further said coating film has a poor effectiveness to give the surface of base water repellency, lubricancy, heat resistance and the like, and durability of said effectiveness is also insufficient.

On the other hand, heat sensitive transfer recording film consists of a base film and a heat sensitive ink layer formed on one side of said base film and said heat sensitive transfer recording film is used to form a recording picture on the recording paper by attaching the heat sensitive ink layer of said heat sensitive transfer recording film to the recording paper, generating a pulse signal from the thermal head arranged in the opposite side to the said heat sensitive ink layer to heat selected portion of said heat sensitive ink layer, said heated portion of said heat sensitive ink layer is melted or sublimated to transfer to the recording paper.

Said heat sensitive transfer recording system has advantages in that no noise is generated during printing and a recording picture has an excellent heat resistance, an excellent water resistance, an excellent chemical resistance, an excellent plasticizer resistance, an excellent preservativeness and the like. While said heat sensitive transfer recording system has faults in that the base film is partially melted by a high temperature of the thermal head and said melted base film sticks to the thermal head resulting in an obstacle in conveying the heat sensitive transfer recording film and obstructing transcription from the heat sensitive ink layer of the heat sensitive transfer recording film to the recording paper.

To solve the above mentioned sticking problems, a sticking proof layer is formed on the thermal head side of said base film.

Hitheroto, a metal layer such as an aluminum layer and the like, a coating layer of lubricant such as silicone, paraffin and the like, a thermosetting resin layer such as polyurethane resin, epoxy resin, melamine resin and the like, cellulose derivative such as ethylcellulose and the like have been provided as said sticking proof layer.

Nevertheless, said traditional sticking proof layer has a poor ability to prevent sticking and long curing time at a high temperature is necessary for said thermosetting resins resulting in poor workability and poor practical use and further in the case where said sticking proof layer has a good sticking proof ability, said sticking proof layer has poor adhesiveness to the base film.

To solve the above mentioned problems, the graft copolymer layer, which has polydimethyl siloxane as branch, has been provided as a sticking proof layer (Tokkai Hei No. 1-214475).

Nevertheless, since said sticking proof layer consisting of only said graft copolymer has poor adhesiveness to the base film and poor wear resistance, and further poor mechanical strength such as tensile strength and the like, resulting in peeling of a sticking proof layer attached to the thermal head (head refuse).

MEANS OF SOLVING THE PROBLEMS

To solve said traditional problems, the present invention provides a compound containing polydimethylsiloxane copolymer (A) and the second component (B) that is one or more synthetic resin(s) (B-1) selected from a group consisting of polyvinyl acetate derivatives, polyamide, acrylic resin, epoxy resin, unsaturated polyester resin and precursor of unsaturated polyester, and/or cellulose derivatives (B-2); an anti-sticking agent containing said compound; and further a heat sensitive transfer recording film comprising a base film wherein a heat sensitive ink layer is formed on one side of said film and anti-sticking layer containing polydimethylsiloxane copolymer (A) and the second component (B) that is one or more synthetic resin(s) (B-1) selected from a group consisting of polyvinyl acetate derivatives, polyamide, acrylic resin, epoxy resin, unsaturated polyester resin and precursor of unsaturated polyester, and/or cellulose derivatives (B-2).

Desirable polydimethylsiloxane copolymer in the present invention is block type copolymer, especially block type copolymer produced by polymerization of vinyl monomer using polydimethylsiloxane amide containing an azo group as an initiator.

DESCRIPTION OF THE EMBODIMENTS

Detailed description of the present invention is as follows.
[Polydimethylsiloxane Copolymer (A)]

Polydimethylsiloxane copolymer (A) used in a sticking proof layer of sticking proof agents or heat sensitive transfer recording film may be graft type copolymer or block type copolymer. Nevertheless by using block type polydimethylsiloxane copolymer, repelling of coated heat sensitive ink caused by the transfer of unreacted silicone to the reverse side of the base film on which said heat sensitive ink is to be coated and transfer inferiority caused by the transfer of unreacted silicone to the heat sensitive ink the layer of the resulting heat sensitive transfer recording film during storage are prevented.

Graft type polydimethylsiloxane copolymer (A-1) may be produced by copolymerization of graft type reactive silicone and vinyl monomer which can copolymerize with said reactive silicone by applying such as the macromonomer method.

Said graft type reaction silicone is a reactive silicone having an unsaturated double bond on its one end such as;
[chemical formula:1]

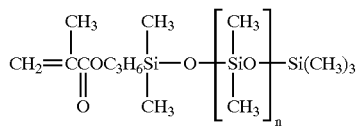

n is an integer of 0–64

[chemical formula:2]

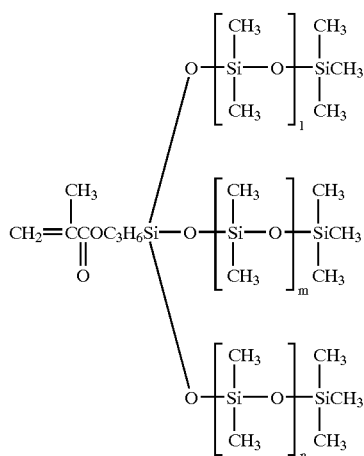

l + m + n ≤ 64

As the vinyl monomer that can be copolymerized with the above reactive silicone, for example, aliphatic or cyclic acrylate and/or methacrylate such as methylacrylate, ethylacrylate, n-propylacrylate, isopropylacrylate, n-butyl aery late, isobutylacrylate, t-butylacrylate, 2-ethylhexylacrylate, cyclohexylacrylate, tetrahydrofurfurylacrylate, stearylacrylate, laurylacrylate, methylmethacrylate, ethylmethacrylate, n-propylmethacrylate, isopropylmethacrylate, n-butylmethacrylate, isobutylmethacrylate, 2-ethylbexylmethacrylate, cyclohexylmethacrylate, tetrahydrofurfurylmethacrylate, stearylmethacrylate, laurylmethacrylate and the like; the vinylether group such as methyvinylether, ethylvinylether, n-propyl vinylether, n-butylvinylether, isobutylvinylether and the like; the styrene group such as styrene, α-methylstyrene and the like; nitril monomer such as acrylonitril, metacrylonitril and the like; vinyl fatty ester such as vinylacetate, vinylpropionate and the like; monomer containing halogen such as vinylchloride, vinylidenechloride, vinylfluorine, vinylidenefluorine and the like; the olefin group such as ethylene, propylene, isoprene and the like; the diene group such as chloroprene, butadiene and the like; α,β-unsaturated carboxylic acid such as acrylic acid, methacrylic acid, itaconic acid, maleic acid, maleic anhydride, crotonic acid, atropic acid, citraconic acid and the like; the amide group such as acrylamide, methacrylamide, N,N-methylolacrylamide, N,N-dimethylacrylamide, diacetonacrylamide, methylacrylamideglycolatemethylether and the like; monomer containing the amino group such as N,N-dimethylaminoethylmethacrylate, N,N-diethylaminoethylmethacrylate, N,N-dimethylaminopropylmethacrylate, N,N-dimethylaminoethylacrylate, N,N-diethylaminoethylacrylate, N,N-dimethylaminopropylacrylate and the like; monomer containing the epoxy group such as glycidylacrylate, glycidlymethacrylate, glycidylallylether and the like; 2-hydroxyethylmethacrylate, 2-hydroxyethylacrylate, 2-hydroxypropylmethacrylate, 2-hydroxypropylacrylate, 4-hydroxybutylacrylate; allylalcohol; reactant of cardula E and acrylic acid, methacrylic acid, itaconic acid, maleic acid, maleic anhydride, crotonic acid and the like; and vinylpyrrolidone, vinylpyridine, vinylcarbazole and the like may be used. As the vinyl monomer having a silyl group which can be hydrolyzed, a silane coupling agent such as γ-methacryloxypropyltrimethoxysilane, γ-methacryloxypropyltriethoxysilane, γ-methacryloxypropylmethyldimethoxysilane, γ-methacryloxypropylmethyldiethoxysilane, γ-methacryloxypropylmethoxyethoxysilane, vinyltrimethoxysilane, vinyltriethoxysilane and the like may be used. The above monomer may be used singly or as a mixture of two or more kinds. The above examples don't limit the present invention.

On the other hand, the polydimethylsiloxane block copolymer (A-2) includes block copolymers having the following structures.

① $(a^1*a^2)_l$
② $a^1(a^1*a^2)_m$
③ $a^2(a^1*a^2)_n$ each of l, m and n is an integer of 1–10, $a^1$ is a polydimethylsiloxane part having the following structures.

[chemical formula:3]

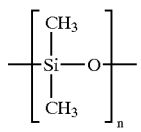

and $a^2$ is a vinylpolymer part.

To produce the above polydimethylsiloxane block copolymer (A-2), ① living polymerization method, ② polymeric initiator method, ③ polymer chain transfer method and the like may be employed, and the method ② and ③ are preferable for industrial production.

In ③ polymeric initiator method, a polymeric azo initiator introducing polydimethylsiloxane portion (such as polydimethylsiloxane amide containing the azo group) is used. Such polymer azo initiator may have the following structures.

[chemical formula:4]

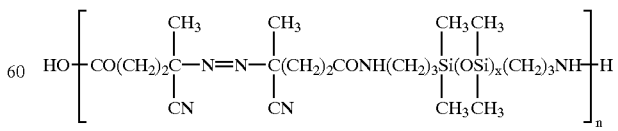

x is an integer of 10–300
n is an integer of 1–50

When vinyl monomer which can copolymerize with said polymer azo-initiator is copolymerized with said polymer azo initiator, a block copolymer may be effectively produced. Further when a polymeric initiator such as a peroxide polymeric initiator, an azo polymeric initiator and the like is used, said block copolymer (A-2) can be produced by 2-step polymerization. For instance, when said azo polymeric initiator is used, the reaction proceeds as follows.
[chemical formula:5]

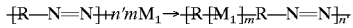

[chemical formula:6]

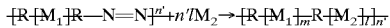

each of m, n', l is an integer 1 or more than 1.

$M_1$ is macromonomer having the following structures.
[chemical formula:7]

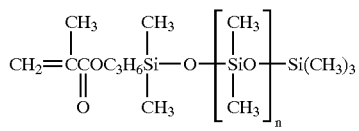

n is an integer of 0–64

[chemical formula:8]

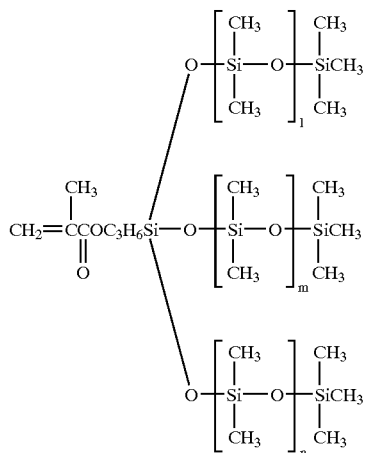

$l + m + n \leq 64$ $M_2$ is a vinyl monomer that can be copolymerized with $M_1$.

R includes the following structures.
[chemical formula:9]

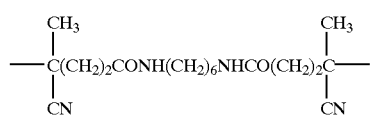

[chemical formula:10]

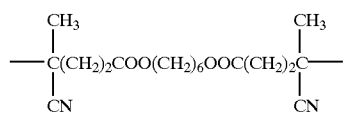

In ③ polymer chain transfer method, a polydimethylsiloxane containing SH group which is produced by addition of HS—$CH_2$ COOH, HS—$CH_2CH_2$COOH and the like to a polydimethylsiloxane containing epoxy ring may be used. Said polydimethylsiloxane containing epoxy ring may have the following structures.
[chemical formula:11]

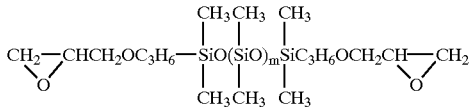

m is an integer of 10–400

[chemical formula:12]

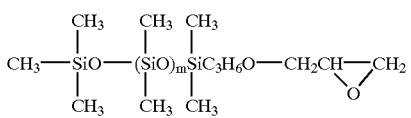

m is an integer of 10–400

Said block copolymer can be produced by the polymerization of vinyl monomer which can copolymerize by using chain transfer of SH group of said polydimethylsiloxane.

As the vinyl monomer that can be copolymerized in the ② polymer initiator method or ③ polymer chain transfer method, for example, aliphatic or cyclic acrylate and/or metacrylate such as methylacrylate, ethylacrylate, n-propylacrylate, isopropylacrylate, n-butylacrylate, isobutylacrylate, t-butylacrylate, 2-ethylhexylacrylate, cyclohexylacrylate, tetrahydrofurfurylacrylate, stearylacrylate, laurylacrylate, methylmetacrylate, ethylmetacrylate, n-propylmetacrylate, isopropylmetacrylate, n-butylmetacrylate, isobutylmetacrylate, 2-ethylhexylmetacrylate, cyclohexylmetacrylate, tetrahydrofurfurylmetacrylate, stearylmetacrylate, laurylmetacrylate and the like; the vinylether group such as methyvinylether, ethylvinylether, n-propylvinylether, n-butylvinylether, isobutylvinylether and the like; the styrene group such as styrene, α-methylstyrene and the like; nitril monomer such as acrylonitril, metacrylonitril and the like; vinyl fatty ester such as vinylacetate, vinylpropionate and the like; monomer containing halogen such as vinylchloride, vinylidenechloride, vinylfluoride, vinylidenefluoride and the like; the olefin group such as ethylene, propylene, isoprene and the like; the diene group such as chloroprene, butadiene and the like; α, β-unsaturated carboxylic acid such as acrylic acid, metacrylic acid, itaconic acid, maleic acid, maleic anhydride, crotonic acid, atropic acid, citraconic acid and the like; the amide group such as acrylamide, metacrylamide, N,N-methylolacrylamide, N,N-dimethylacrylamide, diacetonacrylamide, methylacrylamideglycolatemethylether and the like; monomer containing the amino group such as N,N-dimethylaminoethylmetacrylate, N,N-diethylaminoethylmetacrylate, N,N-dimethylaminopropyl metacrylate, N,N-dimethylaminoethylacrylate, N,N-diethylaminoethylacrylate, N,N-dimethylaminopropylacrylate and the like; monomer containing the epoxy group such as glycidylacrylate, glycidylmetacrylate, glycidylallylether and the like; 2-hydroxyethylmetacrylate, 2-hydroxyethylacrylate, 2-hydroxypropylmetacrylate, 2-hydroxypropylacrylate, 4-hydroxybutylacrylate; allylalcohol; reactant of cardula E and acrylic acid, metacrylic acid, itaconic acid, maleic acid, maleic anhydride, crotonic acid and the like; and vinylpyrrolidone, vinylpyridine, vinylcarbazole and the like may be used. As the vinyl monomer having a silyl group which can be hydrolyzed, a silane coupling agent such as γ-methacryloxypropyltrimethoxysilane, γ-methacryloxypropyltriethoxysilane, γ-methacryloxypropylmethyldimethoxysilane, γ-methacryloxypropylmethyldiethoxysilane, γ-methacryloxypropylmethoxyethoxysilane, vinyltrimethoxysilane, vinyltriethoxysilane and the like may be used. One or more kinds of the above mentioned monomer may be mixed and used. The invention is not limited the embodiments hereinabove.

[The Second Component (B)]

In the present invention, the second component (B) that is mixed with the above polydimethylsiloxane copolymer (A) is at least one kind of synthetic resin (B-1) selected from the group of polyvinylacetate derivatives, polyamide, acrylic resin, epoxy resin, unsaturated polyester resin and unsaturated polyester prepolymer, or cellulose derivatives (B-2), or a mixture of B-1 and B-2, preferably, at least one kind of synthetic resin (B-1') selected from the group of polyvinylacetate derivatives, polyamide and acrylic resin, or cellulose derivatives (B-2), or a mixture of B-1' and B-2.

As the polyvinylacetate derivatives, for example, polyvinylacetoacetal, polyvinybutylal, polyvinyformal and the like may be used. As the polyamide, for example, N-methoxymethylationed nylon and the like may be used. As the unsaturated polyester prepolymer, for example, polyesterpolyacrylate, polyesterpolymetacrylate and the like may be used. As the cellulose derivatives, for example, nitro cellulose, ethyl cellulose, hydroxyethyl cellulose, ethylhydroxyethyl cellulose, hydroxypropyl cellulose, carboxymethyl cellulose, cellulose acetate, cellulose acetatepropionate, cellulose acetatebutylate and the like may be used. The above each synthetic resin and cellulose derivatives may be used singly or as a mixture of two or more kinds.

[Production of Polydimethylsiloxane Copolymer (A)]

As above mentioned, said polydimethylsiloxane graft copolymer (A-1) is produced by copolymerization of graft type reactive silicone and vinyl monomer which can copolymerize with said reactive silicone by such as macromonomer method. Further said polydimethylsiloxane block copolymer (A-2) is produced by the polymerization of vinyl monomer which can copolymerize with said polymeric initiator in which said polydimethylsiloxane is introduced ((2) polymeric initiator method) and also produced by the copolymerization of vinyl monomer which can copolymerize by using chain transfer of the SH group of such polymethylsiloxane containing SH group. ((3) polymer chain transfer method).

The above polymerization reaction is usually carried out in a solution. In the solution polymerization, an aromatic hydrocarbon solvent such as toluene, xylene and the like; a ketone solvent such as acetone, methylethylketone, methylisobutylketone and the like; an ester solvent such as ethylacetate, propylacetate, isobutylacetate, butylacetate and the like; an alcohol solvent such as methanol, ethanol, isopropanol, butanol, isobutanol and the like may be used singly or as a mixed solvent.

In the solution polymerization, a polymerization initiator such as benzoylperoxide, laurylperoxide, cumenehydroperoxide, dicumylperoxide, t-butylperoxyisopropylcarbonate, t-butylperbenzoate, di-t-butylperoxide, azobisisobutyronitrile, azobisvaleronitrile and the like can also be used, but in ②polymeric initiator method, the polymerization initiator may not always be used.

In the obtained polydimethylsiloxane copolymer (A), the content of siloxane is 1–60 wt %, preferably 5–40 wt % and the content of vinyl monomer that can be copolymerized is 99–40 wt %, preferably 95–60 wt %. A vinyl monomer having an OH group or an epoxy group is preferably contained in the vinyl monomer.

[The Mixture of Polydimethylsiloxane Copolymer (A) and Second Component (B)]

Mixing of polydimethylsiloxane copolymer (A) and the second component (B) may be carried out in an ordinary method. The mixing rate of A:B (solid rate) is 99:1–20:80, preferably 95:5–30:70, more preferably 95:5–50:50.

Said compound of the present invention containing polydimethylsiloxane copolymer (A) and the second component (B) can be used as a sticking proof agent for heat sensitive transfer recording film as explained below. Besides this use, plastic film or paper with the coating layer(s) of said compound or one or both side(s) can be used as a magnetic recording tape, releasing film, the base of an adhesive tape, an adhesive label, the base of sealing material, casting, process film or process paper used to produce foamed polyurethane for medical treatment, food packing sheet or food packing paper and the like.

[Manufacture of Heat Sensitive Transfer Recording Film]

As the base film used for the present invention, for example, plastic film such as polyethylene, polypropylene, polyvinylchloride, polyvinylidenechloride, polyester, polyamide and the like; engineering plastic film such as polyimide, polyethyleneterephthalate, polycarbonate, polyacetal, polyphenyleneoxyde and the like; fiber-material derivative film such as cellophane may be used. The mixture of the above polydimethylsiloxane copolymer (A) and the above second component (B) is coated on one side surface of the base film to form a sticking proof layer.

To form the sticking proof layer, the solution wherein the mixture of the polydimethylsiloxane copolymer (A) and the second component (B) is dissolved in an organic solvent such as acetone, methylethylketone, methylisobutylketone, methylacetate, ethylacetate, benzene, toluene, xylene, tetrahydrofurane, ethyleneglycolmonomethylether, propyleneglycolmonomethylether and the like is coated on the surface of said base film by a spray gum, a bar coater, a roll coater, a knife coater, an air knife coater and the like and after coating said film is desirably heated to dry. The coating amount of said organic solvent solution is ordinarily adjusted to be 0.01–5 g/m$^2$ desirably 0.05–2 g/m$^2$ solid and thickness of the formed sticking proof layer is ordinarily adjusted to be 0.01–5 μm, desirably 0.05–2 μm.

Crosslinker such as polyvalent isocyanate compound (toluenediisocyanate, tolylenediisocyanate, paraphenylenediisocyanate, hexamethylenediisocyanate and the like), melamine or alcohol-modified melamine and the like may be added to said organic solvent solution mixture of said polymethylsiloxane polymer (A) and the second compound (B). By adding of said crosslinking agent, the heat resistance of said sticking proof layer may be improved. Further if desirable, a curing agent such as dibutyltindilaurate and the like may be added to said organic solvent solution.

Still further if desirable, a filler such as calcium carbonate carbon black, silica powder and the like may be added to said organic solvent solution.

Said sticking proof layer is formed on one side of the base film and a heat sensitive ink layer is formed on the other side of the base film. Said heat sensitive ink layer consists of well known materials such as thermoplastic resin, dyestuff, pigment and the like.

As the thermoplastic resin, for example, polyethylene, polypropylene, ethylene-propylene copolymer, ethylene-vinylacetate copolymer, ethylene-acrylic ester copolymer, vinylacetate-vinylchloride copolymer, styrene-acrylonitrile copolymer, acrylonitrile-butadiene copolymer, styrene-butadiene copolymer, acrylonitrile-butadiene-styrene copolymer, styrene-acrylic ester-acrylamide copolymer, poly(met)acrylic ester, polyvinylacetate, thermoplastic polyamide, thermoplastic polyester and the like may be used. As the dye, oil-soluble dye such as Oleosol first blue EL (produced by Sumitomo Chemical Co., Ltd.), Oleosol first black BL (produced by Sumitomo Chemical Co., Ltd.) or Sumiplast blue OR (produced by Sumitomo Chemical Co., Ltd.) may preferably be used. In the case where pigment is added, organic pigment such as azo series, anthraquinone series, indigoid series, cyanine series and the like; inorganic pigment such as carbon black, chrome yellow, titanium oxide and the like may be used.

If desired, oil such as paraffin oil, silicon oil, mineral oil, turpentine oil and the like; a plasticizer such as dioctylphtalate, dibutylphtalate and the like; a dispersant; or a stabilizer and the like may be added to the heat-sensitive ink.

The heat sensitive ink is coated to the surface of the base film by the same method as the method to coat the above sticking proof layer.

Said compound of the present invention contains polydimethylsiloxane polymer (A) and the second component (B) and said polymer (A) and said component (B) are mixed together to form micro phase separation structure in the coating film and as a result, polydimethylsiloxane is concentrated on the surface of the coating film and the lubricating property, heat resistance, water repellent property and the like are effectively displayed on said surface.

Further, said sticking proof agents use a mixture of said polydimethylsiloxane copolymer (A) and the second component (B), one or more synthetic resin (B-1) selected from a group consisting of polyvinyl acetate derivatives, polyamide, acrylic resin, epoxy resin, unsaturated polyester resin and/or precursor of unsaturated polyester resin, and/or cellulose derivatives (B-2) may give adhesiveness, wear resistance, mechanical strength such as tensile strength and the like to the coating film such that said heat transfer recording film of the present invention has excellent properties so that said sticking proof layer does not peel from the base or is not shaved by the friction of the thermal head and as a result no head refuse is generated.

Further said polydimethylsiloxane copolymer (A), especially polydimethylsiloxane block copolymer (A-2) has a block structure consisting of polydimethylsiloxane and polymer part of vinyl monomer and no non-reactive silicone remains in said copolymer (A-2) such that the heat sensitive transfer recording film of the present invention wherein said polydimethylsiloxane copolymer is used has a good smoothness, no repelling property of the heat sensitive ink, and transferring obstruction of said heat sensitive ink is completely prevented.

WORKING EXAMPLES

Production of Polydimethylsiloxane Block Copolymer (A-2)

Example of Production 1

200 parts by weight of isopropyl alcohol, 45 parts by weight of methylmethacrylate, 15 parts by weight of n-butylmethacrylate, 20 parts by weight of 2-hydroxyethylmethacrylate and 20 parts by weight of VPS-0501 (polydimethylsiloxaneamide containing an azo group, length of silicone chain, 5000, produced by WAKO JUNYAKU KYOGO CO,) are put in a 500 ml flask with a stirrer, a thermometer, a condenser and a nitrogen gas introducing pipe and said mixture is stirred to be uniform and heated at 80° C. for 5 hours to be polymerized. The resulting copolymer solution A-(1) had a solid content 33.3% by weight.

Example of Production 2

A mixture of 40 parts by weight of methylmethacrylate, 20 parts by weight of n-butylmethacrylate, 10 parts by weight of Δ-methacryloxypropyl trimethoxysilane and 10 parts of VPS-0501 was used in this EXAMPLE in place of 45 parts by weight of methylmethacrylate, 15 parts by weight of n-butylmethacrylate and 20 parts by weight of VPS-0501 in EXAMPLE 1 and said mixture is polymerized by the same apparatus procedure as EXAMPLE OF PRODUCTION 1. The resulting copolymer solution A-(2) had a solid content 33.3% by weight.

Example of Production 3

A mixture was polymerized by the same apparatus and procedure as EXAMPLE OF PRODUCTION 1. In said mixture, 35 parts by weight of methylmethacrylate and 30 parts of weight of VPS-1001 (polydimethylsiloxaneamide containing azo group, the length of silicone chain 10000, produced by WAKO JUNYAKU KOGYO CO.) were used in place of 45 parts by weight of methylmethacrylate and 20 parts by weight of VPS-0501 in EXAMPLE OF PRODUCTION 1. The resulting copolymer solution (A-3) had a solid content 33.3% by weight.

Example of Production 4

A mixture was polymerized by the said apparatus and procedure as EXAMPLE OF PRODUCTION 3. In said mixture, 10 parts by weight of glycidylmethacrylate, 25 parts by weight of VPS-1001 and 15 parts by weight VPS-0501 were used in place of 30 parts by weight of VPS-1001 and 20 parts by weight of 2-hydroxyethylmethacrylate in EXAMPLE OF PRODUCTION 3. The resulting copolymer solution A-(4) had a solid content 33.3% by weight.

Example of Production 5

A mixture was polymerized by the same apparatus and procedure as EXAMPLE OF PRODUCTION 3. In said mixture 20 parts by weight of methylmethacrylate, 10 parts weight of 2-hydroxyethylmethacrylate, and 25 parts by weight of methacrylic acid were used in place of 35 parts by weight of methylmethacrylate and 20 parts by weight of 2-hydroxyethylmethacrylate in Example of Production 3. The resulting copolymer solution A-(5) had a solid content 33.3% by weight.

Production of Polydimethylsiloxane Graft Copolymer (A-1)

Example of Production 6

A mixture of 200 parts by weight of isopropyl alcohol, 40 parts by weight of methylmethacrylate, 15 parts by weight of n-butylmethacrylate, 20 parts by weight of 2-hydroxyethylmethacrylate, 15 parts by weight of FM-0725 (polydimethylsiloxane having a methacryloyl group at one end, the length of silicone chain 10000, produced by CHISSO Co.), 10 parts by weight of γ-methacryloxy propyltrimethoxysilane and 1 part by weight of azobisisobutylonitril were put in the same reaction as used in EXAMPLE OF PRODUCTION 1 and heated at 80° C. for 5 hours to polymerize. The resulting copolymer A-(6) had a solid content of 33.3% by weight.

Example of Production 7

A mixture of 25 parts by weight of FM-0721 (polydimethylsiloxane having a methacryloyl group at one end, the length of silicone chain 5000, produced by CHISSO Co.), 25 parts by weight of methylmethacrylate, 2–10 parts by weight of 2-hydroxyethylmethacrylate and 25 parts by weight of methacrylic acid were used in place of 15 parts by weight of FM-0725, 40 parts by weight of methylmethacrylate, 20 parts by weight of 2-hydroxyethylmethacrylate, and 10 parts by weight of r-methacryloxypropyltrimethoxysilane. Said mixture was polymerized by the same apparatus and procedure as EXAMPLE OF PRODUCTION 6. The resulting copolymer solution had a solid content 33.3% by weight.

Production of the Second Component (B)

Example of Production 8

10 parts by weight of S-LEC KS-5 (polyvinylacetoacetal, produced by SEKISUI KAGAKU Co.) 45 parts by weight of toluene and 45 parts by weight of ethanol were put in the same apparatus and procedure as used in EXAMPLE OF PRODUCTION 1 and said mixture was stirred to be uniform. The resulting resin solution B-(1) had a solid content 10% by weight.

Example of Production 9

TORESIN F-30 (N-methoxymethylnylon, produced by TEIKOKU KAGAKU SANGYO Co.) was used in this EXAMPLE in place of S-LEC KS-5 in EXAMPLE OF PRODUCTION 8 and a resin solution B-(2) having a solid content 10% by weight was prepared by the same apparatus and procedure as used in EXAMPLE OF PRODUCTION 1.

Example of Production 10

10 parts by weight of BR-80 (acrylic resin, produced by MITSUBISHI RAYON Co.) and 90 parts by weight of toluene were used in place of 10 parts by weight of S-LEC KS-5, 45 parts by weight of toluene, and 45 parts by weight of ethanol in EXAMPLE OF PRODUCTION 8 and a resin solution B-(3) having a solid content 10% by weight was prepared by the same apparatus and procedure as used in EXAMPLE OF PRODUCTION 1.

Example of Production 11

EC N-100 (ethylcellulose, produced by Hercules Co.) was used in place of S-LEC KS-5 in EXAMPLE OF PRODUCTION 8 and a resin solution B-(4) having a solid content 10% by weight was prepared by the same apparatus and procedure as used in EXAMPLE OF PRODUCTION 1.

Example of Production 12

10 parts by weight of CAP 482-0.5 (Cellulose acetate propionate, produced by EASTMAN CHEMICAL Co.) and 90 parts by weight of methylethylketone were used in place of 10 parts by weight of S-LEC KS-5, 45 parts by weight of toluene and 45 parts by weight of ethanol in EXAMPLE OF PRODUCTION 8 and a resin solution B-(5) having a solid content 10% by weight was prepared by the same apparatus and procedure as used in EXAMPLE OF PRODUCTION 1.

Example 1

A mixed solution having a solid content 22.8% by weight was prepared by mixing 55 parts by weight of copolymer solution A-(1) OF EXAMPLE OF PRODUCTION 1 and 45 parts by weight of resin solution B-(1) of EXAMPLE OF PRODUCTION 8. The resulting mixed solution was then diluted by methylethylketone to a solid content 5% by weight and PET film having a thickness 25 µm was coated with said diluted solution by using a bar coater and then heated to dry at 100° C. for 3 minutes and a colorless and transparent coating film (sticking proof layer) having a thickness 0.5 µm was formed on said film to make a sample a.

Example 2

A mixed solution having a solid content 29.8% by weight was prepared by mixing 85% parts by weight of copolymer solution A-(2) of EXAMPLE OF PRODUCTION 2 and 15 parts by weight of resin solution B-(2) of EXAMPLE OF PRODUCTION 9. The resulting mixed solution was then diluted by methylethyl ketone to a solid content 5% by weight and PET film having a thickness 25 µm was coated with said diluted solution by using a bar coater and then heated to dry at 100° C. for 3 minutes and a colorless and transparent coating film (sticking proof layer) having a thickness 0.5 µm was formed on said film to make a sample b.

Example 3

A mixed solution having a solid content 18.2% by weight was prepared by mixing 35 parts by weight of copolymer solution A-(3) of EXAMPLE OF PRODUCTION 3 and 65 parts by weight of resin solution B-(3) of EXAMPLE OF PRODUCTION 10. The resulting mixed solution was then diluted by methylethyl ketone to a solid content 5% by weight and PET film having a thickness 25 µm was coated with said diluted solution by using a bar coater and then heated to dry at 100° C. for 3 minutes and a colorless and transparent coating film (sticking proof layer) having a thickness 0.5 µm was formed on said film to make a sample c.

Example 4

A mixed solution having a solid content 15.6% by weight was prepared by mixing 24 parts by weight of copolymer solution A-(4) of EXAMPLE OF PRODUCTION 4 and 76 parts by weight of resin solution B-(4) of EXAMPLE OF PRODUCTION 11. The resulting mixed solution was then diluted by methylethyl ketone to a solid content 5% by weight and PET film having a thickness 25 µm was coated with said diluted solution by using a bar coater and then heated to dry at 100° C. for 3 minutes and a colorless and transparent coating film (sticking proof layer) having a thickness 0.5 µm was formed on said film to make a sample d.

Example 5

A mixed solution having a solid content 19.3% by weight was prepared by mixing 40 parts by weight of copolymer solution A-(5) of EXAMPLE OF PRODUCTION 5, 20 parts by weight of resin solution B-(1) of EXAMPLE OF PRODUCTION 8 and 40 parts by weight of resin solution B-(4)

of EXAMPLE OF PRODUCTION 11. The resulting mixed solution was then diluted by methylethyl ketone to a solid content 5% by weight and PET film having a thickness 25 μm was coated with said diluted solution by using a bar coater and then heated to dry at 100° C. for 3 minutes and a colorless and transparent coating film (sticking proof layer) having a thickness 0.5 μm was formed on said film to make a sample e.

Example 6

A mixed solution having a solid content 27.5% by weight was prepared by mixing 75 parts by weight of copolymer solution A-(6) of EXAMPLE OF PRODUCTION 6 and 25 parts by weight of resin solution B-(5) of EXAMPLE OF PRODUCTION 12. The resulting mixed solution was then diluted by methylethyl ketone to a solid content 5% by weight and PET film having a thickness 25 μm was coated with said diluted solution by using a bar coater and then heated to dry at 100° C. for 3 minutes and a colorless and transparent coating film (sticking proof layer) having a thickness 0.5 μm was formed on said film to make a sample f.

Example 7

A mixed solution having a solid content 17.0% by weight was prepared by mixing 30 parts by weight of copolymer solution A-(7) of EXAMPLE OF PRODUCTION 7, 50 parts by weight of resin solution B-(3) of EXAMPLE OF PRODUCTION 10 and 20 parts by weight of resin solution B-(5) of EXAMPLE OF PRODUCTION 12. The resulting mixed solution was then diluted by methylethyl ketone to a solid content 5% by weight and PET film having a thickness 25 μm was coated with said diluted solution by using a bar coater and then heated to dry at 100° C. for 3 minutes and a colorless and transparent coating film (sticking proof layer) having a thickness 0.5 μm was formed on said film to make a sample g.

Comparison 1

Copolymer solution A-(2) of EXAMPLE OF PRODUCTION 2 was diluted by methylethyl ketone to a solid content 5% by weight and PET film having a thickness 25 μm was coated with said diluted solution by using a bar coater and then heated to dry at 100° C. for 3 minutes and a colorless and transparent coating film (sticking proof layer) having a thickness 0.5 μm was formed on said film to make a sample h.

Comparison 2

Copolymer solution A-(4) of EXAMPLE OF PRODUCTION 4 was diluted by methylethyl ketone to a solid content 5% by weight and PET film having a thickness 25 μm was coated with said diluted solution by using a bar coater and then heated to dry at 100° C. for 3 minutes and a colorless and transparent coating film (sticking proof layer) having a thickness 0.5 μm was formed on said film to make a sample i.

Comparison 3

Copolymer solution A-(6) of EXAMPLE OF PRODUCTION 6 was diluted by methylethyl ketone to a solid content 5% by weight and PET film having a thickness 25 μm was coated with said diluted solution by using a bar coater and then heated to dry at 100° C. for 3 minutes and a colorless and transparent coating film (sticking proof layer) having a thickness 0.5 μm was formed on said film to make a sample j.

Samples a to j prepared in EXAMPLE 1 to 7 and COMPARISON 1 to 3 were trimmed before test. 5 pieces of each sample were piled such that the surface side of the lower piece attaches to the back side of the upper piece respectively and said piled pieces were placed between a pair of glass plates and a weight of 40 g/cm$^2$ was charged on a pair of glass plates between which said piled pieces were placed and then said glass plates were heated at 40° C. for 24 hours. Then a heat sensitive ink consisting of 50 parts by weight of paraffin wax, 25 parts by weight of CARNAUBA WAX, 10 parts by weight of ethylene-vinylacetate copolymer and 15 parts by weight of carbon black was used to coat on the back side of the film of each sample adjusting a thickness to be 4.0 μm to prepare a heat sensitive transfer recording sheet sample. The degree of repelling of said ink was estimated and the result was shown in Table 1.

TABLE 1

| | STRUCTURE OF COPOLYMER | PRODUCTION METHOD | REPELLING OF INK |
|---|---|---|---|
| Example 1 (sample a) | Polydimethyl-siloxane block | Polymer initiator method | No |
| Example 2 (sample b) | Polydimethyl-siloxane block | Polymer initiator method | No |
| Example 3 (sample c) | Polydimethyl-siloxane block | Polymer initiator method | No |
| Example 4 (sample d) | Polydimethyl-siloxane block | Polymer initiator method | No |
| Example 5 (sample e) | Polydimethyl-siloxane block | Polymer initiator method | No |
| Example 6 (sample f) | Polydimethyl-siloxane graft | Macromonomer method | Wide area |
| Example 7 (sample g) | Polydimethyl-siloxane graft | Macromonomer method | Partially |
| Comparison 1 (sample h) | Polydimethyl-siloxane block | Polymer initiator method | No |
| Comparison 2 (sample i) | Polydimethyl-siloxane block | Polymer initiator method | No |
| Comparison 3 (sample j) | Polydimethyl-siloxane graft | Macromonomer method | whole area |

Further 5 pieces of each heat sensitive transfer recording sheet prepared in the above mentioned EXAMPLES and COMPARISONS were piled such that the heat sensitive ink coating surface attached to the sticking proof layer respectively and said piled sheets were placed between a pair of glass plates and a weight of 40 g/cm$^2$ was charged on a pair of glass plates between which said piled sheets were placed and then said glass plates were heated at 60° C. for 24 hours. Recording of such heat sensitive transfer recording sheet treated in the above mentioned manner was carried out by various charge voltage and pulse width charged to the thermal head in the range between 1.0 to 3.0 mj/dot. The situation of the printing, the sticking proof property and the degree of production of head refuse by peeling of said sticking proof agents which attached to the thermal head were observed. The result was shown in Table 2.

TABLE 2

| | STICKING | TRANSFER OBSTRUCTION | HEAD REFUSE |
|---|---|---|---|
| Example 1 (sample a) | No | No | No |
| Example 2 (sample b) | No | No | No |
| Example 3 (sample c) | No | No | No |
| Example 4 (sample d) | No | No | No |
| Example 5 (sample e) | No | No | No |
| Example 6 (sample f) | No | Slightly | No |
| Example 7 (sample g) | No | Slightly | No |

TABLE 2-continued

|  | STICKING | TRANSFER OBSTRUCTION | HEAD REFUSE |
|---|---|---|---|
| Comparison 1 (sample h) | No | No | Yes |
| Comparison 2 (sample i) | No | No | Yes |
| Comparison 3 (sample j) | No | Wide area | Yes |

No sticking and head refuse were observed for each sheet of EXAMPLES 1 to 7. Especially, no repelling of ink and unevenness of printing (transfer obstruction) were observed for each sheet of EXAMPLES 1 to 5 while no sticking was observed, but production of head refuse was observed for each sheet of COMPARISONS 1 to 3.

EFFECTS OF THE INVENTION

The compound of the present invention contains a polydimethylsiloxane copolymer (A) and the second component (B) and a micro phase separation structure is formed in the coating film of said compound such that the functions of said coating film, such as lubricating property, heat resistance, water repellency and the like, as special properties of silicone, were effectively exhibited.

By using the sticking proof agents of the present invention containing said component, an excellent efficiency, without head refuse generated in the heat sensitive transfer recording film, can be provided. Especially by using polydimethylsiloxane block copolymer, a heat sensitive transfer recording film has a good smoothness and no repellency of the heat sensitive ink and the transfer obstruction of the heat sensitive ink can be prevented in the present invention.

We claim:

1. A composition containing polydimethylsiloxane block type copolymer and one or more synthetic resin(s) selected from a group consisting of polyvinyl acetate derivatives, polyamide, acrylic resin, epoxy resin, unsaturated polyester resin and precursor of unsaturated polyester and/or cellulose derivatives.

2. An anti-sticking agent containing polydimethylsiloxane block type copolymer and one or more synthetic resin(s) selected from a group consisting of polyvinyl acetate derivatives, polyamide, acrylic resin, epoxy resin, unsaturated polyester resin and precursor of unsaturated polyester and/or cellulose derivatives.

3. An anti-sticking agent in accordance with claim 2, wherein said polydimethylsiloxane copolymer is block copolymer.

4. A heat sensitive transfer recording film comprising a base film wherein a heat sensitive ink layer is formed on one side of said film and an anti-sticking layer including polydimethylsiloxane block type copolymer and one or more synthetic resin(s) selected from a group consisting of polyvinyl acetate derivatives, polyamide, acrylic resin, epoxy resin, unsaturated polyester resin and precursor of unsaturated polyester and/or cellulose derivatives is formed on the opposite side of the base film from said heat sensitive ink layer.

* * * * *